April 18, 1961     E. J. HUNTER ET AL     2,980,385

REMOTE CONTROL VALVE

Filed Aug. 3, 1956

EDWIN J. HUNTER
LORENZO A. RICHARDS
      INVENTORS

BY *Lloyd Spencer*

ATTORNEY

United States Patent Office 2,980,385
Patented Apr. 18, 1961

2,980,385
REMOTE CONTROL VALVE
Edwin J. Hunter and Lorenzo A. Richards, both of
P.O. Box 489, Riverside, Calif.
Filed Aug. 3, 1956, Ser. No. 601,959
10 Claims. (Cl. 251—25)

Our invention relates to remote control valves, and is a continuation-in-part of our previous patent applications for Booster Valves, filed: August 21, 1953, Serial No. 375,775 which issued as Patent No. 2,838,269 on June 6, 1958; and for Remote Control Valve, filed March 1, 1955, Serial No. 491,382, now abandoned.

Included in the objects of our invention are:

First, to provide a remote control valve which has a low size-to-capacity ratio and involves a minimum number of parts, a single yieldable valve membrane not only controlling flow through the valve but also forming a wall of a pressure chamber.

Second, to provide a remote control valve wherein the pressure fluid for control of the valve may be supplied from an extraneous source or be supplied from the upstream side of the valve through a bleed port in the valve membrane, and which, in the latter case, means is provided for automatic cleaning of the bleed port, thereby to minimize the possibility of clogging and permit satisfactory functioning of the valve even when controlling flow of water or other fluid which may contain suspended solid matter.

Third, to provide a remote control valve which is particularly economical of manufacture to the extent that the entire valve may be discarded and replaced upon wear-out of the valve element, although the valve element may be readily removed and replaced, if desired.

Fourth, to provide a remote control valve which may be arranged with flange connections to a fluid line whereby the valve may be installed and removed without disturbing the position of the fluid line.

Fifth, to provide a remote control valve which is particularly adapted for use in connection with automatic irrigation systems such as shown in the patent of Lorenzo A. Richards, issued April 6, 1954, Patent Number 2,674,490, entitled: Method and Apparatus for Irrigating Plants.

With the above and other objects in view as may appear hereinafter, reference is directed to the accompanying drawings in which.

Figure 1:
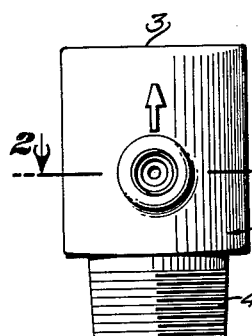
Figure 1 is a side view of one form of our remote control valve.
Figure 2:
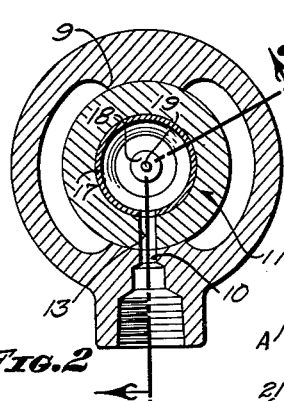
Figure 2 is an enlarged transverse sectional view thereof taken through 2—2 of Fig. 1.

Reference is first directed to Figs. 1 through 4. In the construction here shown a tubular valve body 1 is provided having an inlet end 2 and an outlet end 3. The inlet end is provided with external pipe threads 4; whereas the outlet end is provided with internal screwthreads 5. Between the inlet and outlet ends there is formed a valve cavity 6 which forms with an inlet port 7 leading from the inlet end a valve seat 8.

The valve cavity 6 is provided with two or more internal ribs 9, one of which is intersected by a lateral control passage 10 internally screwthreaded at its extremity for connection to a control line, not shown.

Press fitted between the ribs 9 is a mounting disk 11 having a cavity 12 at its under side and a lateral port 13 communicating with the passage 10. The disk is also provided with a thin-walled depending skirt 14. A substantially hemispherical valve membrane 15 is fitted within the skirt with its convex side directed downward and arranged to engage the valve seat 8. The concave side of the valve membrane 15 is provided with an internal flange 16 and is secured to the margins of the cavity 12 by a flanged sleeve 17 press fitted into the cavity.

The valve membrane 15 is provided with a small central opening fitted with a bushing 18 having a bore forming a bleed port. Secured in the upper end of the disk 11 and projecting downwardly through the bushing 18 is a purging stem 19 of small diameter.

Figure 3:
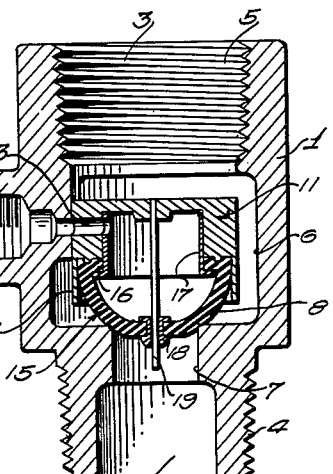
Figure 3 is an enlarged longitudinal sectional view thereof taken through 3—3 of Fig. 2.

Operation of the remote control valve shown in Figs. 1 through 4 is as follows:

The valve membrane 15 normally assumes the position shown in Fig. 3. When the valve is installed in a flow line and flow from the passage 10 is prevented by a suitable valve means, such as a pilot valve A shown diagrammatically in Fig. 3, fluid enters through the bushing 18 into a pressure chamber formed by the cavity 12 and the valve membrane causing the valve membrane to flatten and spread laterally, as shown by solid lines in Fig. 4, as the pressure within the pressure chamber becomes equal to the fluid pressure at the inlet port 7.

Figure 4:
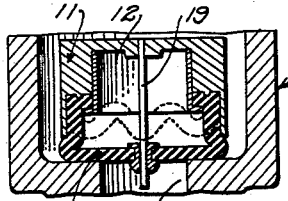
Figure 4 is a fragmentary longitudinal sectional view similar to Fig. 3 showing the valve membrane at it appears in operation, its closed position being shown by solid lines and its open position by dotted lines.

Upon opening the passage 10 the pressure in the pressure chamber is relieved and the valve membrane opens under urge of the inlet pressure as indicated by the dotted line position of the valve membrane shown in Fig. 4.

Movement of the bushing 18 along the pin or stem 18 during movement of the valve membrane keeps the bleed port through the bushing clear.

Figure 5:
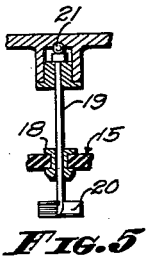
Figure 5 is a fragmentary sectional view illustrating a modified form of purging means for the bleed port through the valve membrane.

Under extreme conditions, it is desirable to increase the purging action within the bleed port. This may be accomplished by providing small vanes 20 on the protruding end of the stem 19 as shown in Fig. 5. The vanes may cause vibration of the stem, or the upper end of the stem 19 may be mounted in a bearing 21 and the vanes twisted to cause the stem to rotate.

Figure 6:
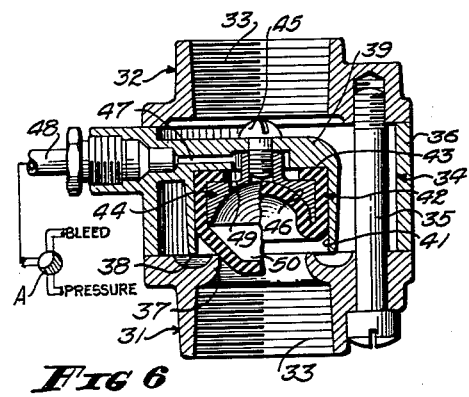
Figure 6 is a longitudinal view of a modified form of remote control valve taken through 6—6 of Fig. 7 and showing one half of the valve membrane in its closed position as it appears in use and the other half thereof in its fully open position.
Figure 7:
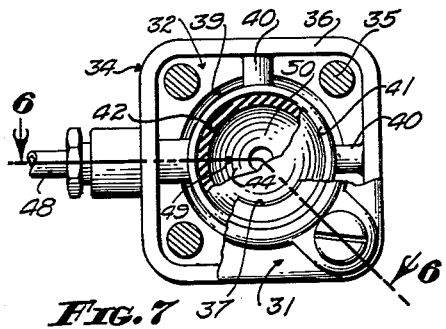
Figure 7 is an end view of the downstream side of the valve with portions broken away to illustrate the internal construction.

Reference is directed to Figs. 6 and 7. In the construction here illustrated a pair of flange fittings 31 and 32 are provided forming the intake and outlet ends respectively of the valve. Both are provided with internally screwthreaded bores 33 or otherwise provided for connection in a pipe line.

The flanged axial ends of the fittings 31 and 32 receive therebetween a valve body 34 the axial ends of which are held in sealing engagement with the fittings by tie bolts 35. The bolts are shown as enclosed within the peripheral wall 36 of the body 34.

The inlet fitting is provided at its flanged end with an internal constriction which forms a valve seat 37 confronting the valve body 34. The valve seat is surrounded by an annular depression 38. The valve body is provided with a centrally disposed mounting core 39 which corresponds to the mounting disk 11. In this case, however, the mounting core is formed integrally with the valve body and is centered within the peripheral walls 36 by radiating webs 40. The mounting core is bored to form a skirt 41 the open end of which confronts the depression 38 and forms therewith a passageway from the inlet around the mounting core. The skirt is larger in diameter than the inlet.

Fitted within the mounting core 39 is a cup-shaped valve membrane 42 corresponding to the valve membrane 15. In this case, the valve membrane 42 includes a cylindrical portion confronting the internal walls of the skirt 41 and provided with an internal flange 43. The valve membrane 42 is secured in place by a clamping disk 44. The clamping disk is first forced into the valve membrane and inserted with the membrane into the mounting core. A screw 45 is inserted through the downstream or closed end of the mounting core and screw-threaded into the clamping disk so as to clamp the internal flange 43.

The downstream or underside of the clamping disk is recessed to form a hemispherical depression 46. The closed end of the valve membrane, which may be frusto-conical or semi-spherical, is so proportioned that it may fold into and be supported in the recess of the clamping disk as indicated in Fig. 6. With this arrangement localized stressing, or stretching of the valve membrane is avoided. This has been found particularly desirable if the fluid pressure is excessive, as the membrane is fully supported. It will be noted that the membrane lifts completely clear of the passageway around the underside of the skirt 41 when in its fully open position. Also, the width of the passageway and the wall thickness of the membrane are approximately the same so the unsupported area of the membrane when in its closed position and under internal pressure is not sufficiently large to place undue stress on the membrane.

One of the webs 40 is enlarged sufficiently to accommodate a small lateral passage 47 which communicates with a pressure fluid supply line 48. A port 49 in the clamping disk 44 connects the passage 47 with a pressure chamber 50 defined by the confronting walls of the clamping disk 44 and valve membrane 42.

Operation of the valve construction shown in Figs. 6 and 7 is as follows:

When pressure fluid is supplied to the chamber 50 at a pressure equal to the line pressure at the upstream side of the valve, the valve membrane occupies the closed position shown in Fig. 6. When the pressure in the chamber 50 is relieved, the line pressure displaces the valve membrane from the closed position to the fully open position shown in Fig. 6. This may be accomplished by a three way pilot valve B indicated diagrammatically in Fig. 6.

The valve membrane 42 is shown without a bleed port; however, it may be equipped with a bleed port formed by the bushing 18 and stem 19 of the first described structure. In such case the line 48 becomes a bleed line, which, when closed, as by a pilot valve A as shown in Fig. 3, permits the upstream pressure to close the valve, and when open bleeds the fluid from the pressure chamber 50 to permit the valve to open. If the stem 19 is provided, it is supported from the screw 45.

It will be observed that the valve body of the valve construction shown in Figs. 6 and 7 may be removed by merely removing the bolts 35 and sliding the valve body laterally, without otherwise disturbing the line in which it is installed. Replacement of the valve membrane is thus readily accomplished.

Figure 8:
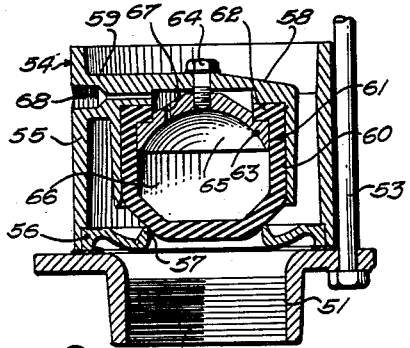
Figure 8 is a fragmentary longitudinal sectional view of a further modified form of the remote control valve especially suited for valves of larger size.

Reference is now directed to Fig. 8. The construction here illustrated is closely similar to the construction shown in Figs. 6 and 7, but is particularly designed for larger sizes of remote control valves. In this construction, a pair of flanges 51 are provided, which may be identical. These are provided with internally screw-threaded bores 52 or otherwise arranged for attachment as by welding to inlet and outlet flow lines not shown. The flanges are provided with a ring of holes adapted to receive tie bolts 53 for joining the flanges.

Fitted between the flanges within the cage formed by the bolts 53 is a hollow valve body 54 having cylindrical walls 55. The walls 55 are provided at the inlet end of the valve body with a slight counterbore which receives a valve seat disk 56. The disk is provided with a valve seat lip 57 facing into the valve body.

The valve body is provided with a centrally disposed mounting core 58 supported from the walls 55 by radial webs 59. The core is recessed to form a cylindrical skirt 60 directed toward the valve seat disk 56. The skirt receives a cup-shaped valve membrane 61, having an internal flange 62 at its open end which is clamped within the upper or closed end of the mounting core by a clamping disk 63 and screw 64. The underside of the disk 63 is provided with a homispherical recess 65 and defines with the interior of the valve membrane a pressure chamber 66. A port 67 through the disk 63 and a lateral passage 68 through one of the webs 59, connects the pressure chamber with a bleed line or fluid pressure line as in the first or second described structures. In the former case, a bushing 18 and stem 19 may define a bleed port through the valve membrane 61.

Operation of the construction shown in Fig. 8 is similar to the previously described remote control valves. In the construction shown in Fig. 8, both the valve body and valve seat disk may be removed or replaced.

Although we have shown and described certain embodiments of our invention, we do not desire to limit the invention thereto, but desire to include within the scope of the invention all novelty inherent in the appended claims.

We claim:

1. A control valve, comprising: a valve body having an inlet port, a valve seat at said inlet port, an outlet port and a valve chamber therebetween, said valve chamber having internal ribs; a mounting core within said ribs and spaced thereby from the walls of the valve chamber, said mounting core having a control passage directed through one of said ribs and walls defining a recess confronting said inlet port of larger diameter than said inlet port and communicating with said control passage, the extremities of said walls being spaced from the portions of the valve chamber walls surrounding said inlet port and forming therewith an annular entrance opening affording communication between said inlet port and said outlet port; a hollow single piece dome-shaped valve membrane formed entirely of yieldable material closing said recess and forming therewith a pressure chamber of larger cross-sectional area than said inlet port, said valve membrane having a wall thickness at least one-half the axial dimension of said entrance opening to bridge said opening and resist pressure differentials between said inlet and outlet ports; means for pressurizing said pressure chamber to force said valve membrane into sealing engagement with said inlet port; and means for relieving the pressure in said pressure chamber to permit opening of said inlet port.

2. A control valve as set forth in claim 1, wherein: said pressurizing means includes a tubular bushing in said valve membrane communicating between said inlet port and said pressure chamber, and a stem retained in said mounting core and projecting through said bushing to restrict said bleed port and wipe said bushing as said valve moves between its open position and closed position.

3. A control valve as set forth in claim 1, wherein: said valve membrane is provided with a bleed port; a stem is rotatably supported by said mounting core and projects through said bleed port to restrict said bleed port; and means is provided to move said stem.

4. A control valve as set forth in claim 1, wherein: said ribs extend longitudinally in said valve chamber and said outlet port and mounting core are dimensioned to permit insertion of said mounting core through said outlet port.

5. A control valve as set forth in claim 1, wherein: said inlet port and outlet port are formed in flange members having parallel confronting faces; said valve chamber is formed within a block laterally slidable between said flanges and having parallel end faces for cooperation with said confronting faces; and tie bolts connect said flange members to clamp said block therebetween.

6. A control valve, comprising: a valve body structure defining an inlet port, a valve chamber, and an outlet port, centering ribs formed within said valve chamber and a control passage directed laterally through one of said ribs; a mounting core located between said ribs and defining with the portions of the walls of the valve chamber surrounding said inlet port an annular entrance passage affording communication between said inlet port and outlet port, said mounting core having a recess within the area of said entrance passage and confronting said inlet port, said recess being in communication with said control passage; a cupped yieldable valve membrane secured to said mounting core and covering said recess to define therewith a pressure chamber, communicating with said control passage, said valve membrane being movable to and from engagement with said inlet port to control flow through said valve body structure in response to change in pressure in said pressure chamber, said valve membrane having a wall thickness at least one-half the axial dimension of said annular entrance passage and arranged to resist pressure differentials between said inlet port and outlet port.

7. A control valve as set forth in claim 1, wherein: said inlet and outlet ports are formed in flange members having confronting parallel faces; said valve chamber is formed within a block laterally slidable between said flanges and having parallel end faces for cooperation with said confronting faces; said valve seat is integral with the flange member having said inlet; and tie bolts join said flange members to clamp said block therebetween.

8. A control valve as set forth in claim 1, wherein: said inlet and outlet are formed in flange members having confronting parallel faces; said valve chamber is formed within a block laterally slidable between said flanges and having parallel end faces for cooperation with said confronting faces; said valve seat is formed in a disk set in one end of said block adjacent said inlet flange member; and tie bolts join said flange members to clamp said block therebetween.

9. A control valve as set forth in claim 1, wherein: said inlet port is surrounded by an annular channel to form a raised valve seat and said skirt extends toward said channel to approximately the level of said valve seat.

10. A control valve, comprising: a valve body structure defining an axially directed inlet having a valve element engaging wall at one end thereof and a continuous annular flow passage radiating from said inlet, said valve body structure also defining a cavity confronting said inlet and terminating in an edge defined by an annular lip of larger diameter than said inlet wall disposed in spaced relation to said inlet wall to define therewith the entrance of said radiating flow passage, said valve body structure also defining an outlet communicating with said flow passage; a flexible cup-shaped valve element sealed by its periphery to the walls of and covering said cavity and extending into engagement with said inlet wall; means communicating with said cavity and extending laterally therefrom to the exterior of said body for pressurizing said cavity to force said valve element into sealing engagement with said inlet wall and radially to close the entrance of said flow passage between said lip and inlet wall and for releasing the pressure in said cavity to retract said valve element and permit flow through said inlet and flow passage, the surface area of said cavity, and the surface area of the portion of said valve element covering said cavity being substantially equal whereby when said valve element is retracted into said cavity said valve element is supported throughout by the walls of said cavity.

References Cited in the file of this patent

UNITED STATES PATENTS

| | | |
|---|---|---|
| 848,739 | Gut | Apr. 2, 1907 |
| 1,269,721 | Kuntny | June 18, 1918 |
| 1,805,733 | Eckstine | May 19, 1931 |
| 1,851,062 | Protzer | Mar. 29, 1932 |
| 1,877,780 | Ackerman | Sept. 20, 1932 |
| 2,039,109 | Pasman | Apr. 28, 1936 |
| 2,724,405 | Stover | Nov. 22, 1955 |
| 2,732,167 | Stout | Jan. 24, 1956 |
| 2,748,798 | Withrow | June 5, 1956 |
| 2,781,051 | Hawley | Feb. 12, 1957 |
| 2,789,577 | Hosking | Apr. 23, 1957 |
| 2,918,250 | Hosking | Dec. 22, 1959 |